Patented June 12, 1934

1,962,602

UNITED STATES PATENT OFFICE 1,962,602

PROCESS OF SMELTING PYRITIC ORES CONTAINING ARSENIC

Nils Erik Lenander, Lokkenverk, Norway, assignor to Patentaktiebolaget Grondal-Ramen, Stockholm, Sweden No Drawing. Application May 13, 1930, Serial No. 452,140. In Sweden April 23, 1930

3 Claims. (Cl. 23—178)

It is known (for instance from the U. S. Patent No. 1,850,557) that if pyrite ores are smelted in a closed blast furnace with a sufficient quantity of reducing agent, for instance coke, substantially all the sulphur of the ore, other than that which goes into the matte and the slag, can be recovered as elemental sulphur. In this process, air or other appropriate oxidizing gas is blown into the furnace approximate the bottom thereof and smelting takes place with the production of molten slag and matte, and the resulting sulphur dioxide gas is largely reduced to elemental sulphur while passing upwardly through the hot coke or other carbonaceous material of the smelting charge above the smelting zone. If the ore contains arsenic compounds, these compounds leave the furnace together with the sulphur vapour and form by their condensation a sulphur product contaminated by arsenic. If the arsenic content is high, such a sulphur product is practically of no value.

I have found that when smelting arsenic sulphide ores a large portion of the sulphur can be obtained free from arsenic. For this purpose the ore is smelted in an enclosed shaft furnace as described in the aforementioned patent, but the reducing agent, e. g. coke, is so proportioned that only a portion of the sulphur dioxide formed at the twyers is reduced to elemental sulphur by the hot coke of the smelting charge, the remainder passing off in the furnace gases as $SO_2$. Only so much elemental sulphur need be present in the furnace gases that a sulphur-arsenic compound is formed at the condensation of the sulphur. In the furnace gases, besides indifferent gases, such as $CO_2$ and $N_2$, both arsenic sulphides and sulphur dioxide are present. Certain other gaseous compounds, such as $CS_2$ and $COS$, and $H_2S$ may also be present.

My present invention thus involves smelting the pyritic ore in a closed blast furnace, with flux if necessary, and with only such amount of coke, or equivalent carbonaceous material, as may be necessary to provide sufficient elemental sulphur (by the reduction of sulphur dioxide) to unite with the arsenic present to form sulphur-arsenic compounds. Where the amount of elemental sulphur derived in the upper part of the furnace by heating of the pyritic ore is adequate to form the contemplated arsenic-sulphur compounds with all the arsenic present in the ore, substantially all of the sulphur dioxide resulting from the smelting operation may be passed unaltered (i. e. not reduced to elemental sulphur) through the furnace. The sulphur-arsenic compounds are removed by condensation from the gaseous product of the smelting operation, and the residual gases are then appropriately treated for the recovery of their sulphur content, principally present in the form of sulphur dioxide. Thus what elemental sulphur is present in the gaseous product of the smelting operation (whether directly derived by heating the pyritic ore or derived by reduction of sulphur dioxide) is utilized to combine with and thus take care of the arsenic content of the ore, whereby it becomes possible to recover the remaining sulphur content of the smelting gases substantially free of arsenic.

The gases of the smelting operation after having left the furnace pass to a condenser and a precipitating chamber, for instance of the electrostatic type, where all the sulphur-arsenic compounds are precipitated. The sulphur dioxide of the gases is now free from arsenic and can be utilized for the production of sulphuric acid or of elemental sulphur. In the latter case the gases are first heated, say to a temperature approximating 400° C., and are then caused to traverse a catalyst chamber containing a suitable catalyst, in which chamber the organic sulphur compounds and $H_2S$ react with $SO_2$ forming elemental sulphur. If the said organic sulphur compounds should not suffice for the reduction of the $SO_2$ to S, a reducing gas, for instance producer gas, may be introduced in the catalyst chamber.

The sulphur obtained is recovered in a condenser and in a precipitating chamber.

For the heating of the gas after the arsenic sulphides have been condensed, the condenser in which the sulphur is partly recovered is so built that the sensible heat of the sulphur gas can be utilized.

In the manner described above a large part of the sulphur in arsenic sulphide ore is obtained as pure sulphur, and further the advantage is gained that the gas leaving the last precipitating apparatus does not contain any quantity of $SO_2$ worth mentioning.

Having now particularly described the nature of my invention and the manner of its operation, what I claim is:

1. The process of smelting pyritic ores containing arsenic in a closed blast furnace in which the sulphur dioxide gas resulting from the smelting reaction passes upwardly through highly heated carbonaceous material admixed with the ore and is thereby partly reduced to elemental sulphur characterized in that the amount of carbonaceous material admixed with the ore is so proportioned that only such part of the ascending sulphur dioxide gas is reduced to elemental sulphur as is required to form arsenic-sulphur compounds with the arsenic present in the ore, and withdrawing the gaseous product of the smelting operation and separating the arsenic-sulphur compounds therein by condensation.

2. The process of smelting pyritic ores containing arsenic in a closed blast furnace, in which the sulphur dioxide gas resulting from the smelting reaction passes upwardly through highly heated coke admixed with the ore and is thereby partly reduced to elemental sulphur characterized in that the amount of coke admixed with the ore is so proportioned that only such part of the ascending sulphur dioxide gas is reduced to elemental sulphur by the highly heated coke as is required (in addition to the elemental sulphur directly derived by heating the pyrite ore) to form arsenic-sulphur compounds with the arsenic present in the ore, and withdrawing the gaseous product of the smelting operation and separating the arsenic-sulphur compounds therein by condensation.

3. The process of smelting pyritic ores containing arsenic in a closed blast furnace in which the sulphur dioxide gas resulting from the smelting reaction passes upwardly through highly heated carbonaceous material admixed with the ore and is thereby partly reduced to elemental sulphur characterized in that the amount of carbonaceous material admixed with the ore is so proportioned that only such part of the ascending sulphur dioxide gas is reduced to elemental sulphur by the highly heated carbonaceous material as is required (in addition to the elemental sulphur vapour directly derived by heating the pyritic ore) to form arsenic-sulphur compounds with the arsenic present in the ore, withdrawing the gaseous product of the smelting operation and separating the arsenic-sulphur compounds therein by condensation, and treating the residual gases for the recovery of the sulphur dioxide therein.

NILS ERIK LENANDER.